United States Patent
May

(10) Patent No.: US 11,428,152 B1
(45) Date of Patent: Aug. 30, 2022

(54) TURBOCHARGER WASTEGATE ACTUATOR ARM

(71) Applicant: GM Global Technology Operations LLC, Detroit, MI (US)

(72) Inventor: Ian A. May, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 17/188,323

(22) Filed: Mar. 1, 2021

(51) Int. Cl.
*F02B 37/18* (2006.01)
*F01D 17/14* (2006.01)
*F01D 17/10* (2006.01)

(52) U.S. Cl.
CPC .......... *F02B 37/186* (2013.01); *F01D 17/105* (2013.01); *F01D 17/145* (2013.01); *F02B 37/18* (2013.01); *F05D 2220/40* (2013.01)

(58) Field of Classification Search
CPC ...... F02B 37/186; F02B 37/18; F01D 17/105; F01D 17/145; F05D 2220/40
See application file for complete search history.

(56) References Cited

U.S. PATENT DOCUMENTS

2019/0017433 A1\* 1/2019 Ledger .................. F02B 37/186

\* cited by examiner

*Primary Examiner* — Audrey B. Walter
*Assistant Examiner* — Edward Bushard
(74) *Attorney, Agent, or Firm* — Vivacqua Crane, PLLC

(57) ABSTRACT

A turbocharger wastegate actuator arm includes a first section made from a rigid composite material, a second section made from a rigid composite material, and a third section made from a flexible polymeric material positioned between and interconnecting the first and second sections and adapted to allow angular deflection of the first section relative to the second section, wherein a longitudinal axis of the first section and a longitudinal axis of the second section define a first angle when the actuator arm is in the first position and the longitudinal axis of the first section and the longitudinal axis of the second section define a second angle when the actuator arm is in the second position, the first angle being greater than the second angle.

20 Claims, 4 Drawing Sheets

TURBOCHARGER WASTEGATE ACTUATOR ARM

INTRODUCTION

The present disclosure relates to an actuator arm for an automotive turbocharger wastegate.

A wastegate is a device mounted internally or external to a vehicle's turbocharger that ensures the turbocharger does not produce more boost than desired. When boost exceeds a preset target, the wastegate will bleed off any additional boost. A turbocharger wastegate is a small valve, which opens at a predetermined limit, to allow surplus exhaust gas to bypass the turbine sand exit through the exhaust pipe once the boost limit preset target is reached.

Most engines can handle a small amount of additional boost, and the temptation is to keep going, as it is relatively easy power. However, there is only so much boost that a turbo can produce. A malfunctioning or improperly assembled wastegate can cause a variety of boost issues.

In some turbochargers, the wastegate includes a spring on one side of a diaphragm and boost pressure on the other side. At the point where boost exerts force greater than the spring pressure, the wastegate opens to bleed off the exhaust gases. Reducing the pressure seen by the wastegate or increasing the strength of the spring will make the wastegate open at higher boost pressure hence the engine will get more boost and power. However, the limit to this is what the turbo can handle, both physically and from the air flow point of view. if too much exhaust gas is sent through the turbine, the unit can over-speed, which puts mechanical stresses on it and can lead to problems, such as breaking shafts or compressor wheels failing.

In addition, the air flowing into the engine can start to get very unpredictable, a situation known as "surge". This can have very detrimental effects on the engine's internals and power delivery. The solution is to tailor the turbo itself to the requirements, and, if necessary, replace a standard version with one designed for the ob. This can be a physically bigger turbo or a different turbine and compressor characteristics.

Under normal operating conditions, any given throttle input should create steady boost levels. Stress caused by an aging or faulty turbocharger can overwhelm the spring that opens the wastegate at a specified pressure. In this case, the wastegate will flutter because the spring cannot keep the gate fully closed. The boost will oscillate and the engine will stumble and surge as the boost varies rapidly. The engine may also respond sluggishly to throttle input since the wastegate is likely bleeding air.

Since some of the turbocharger's output is bleeding out through the fluttering wastegate, the turbocharger will have to work harder to maintain target boost, which will generate heat, increase air intake temperatures and, as a result, harm the engine.

In other turbochargers, the wastegate is operated by an actuator, which provides precise control of the opening and closing of the wastegate. Typically, the wastegate is a valve that is opened and closed by rotating the valve. An actuator is used to rotate the wastegate valve between the open and closed positions. in many instances, an actuator arm interconnects the actuator to the wastegate and translates axial or linear motion of the actuator to rotational motion of the wastegate valve.

Such images typically use metallic components and include sliding frictional engagement between multiple components, as with a lever pin to link plate interface, These types of actuators can result in noise and vibration issues from the components sliding against one another and vibrating relative to one another. Furthermore, sliding contact between these components causes wear, and ultimately failure of the actuator arm. Finally, when these components are made from metallic materials, corrosion will occur and the mass of metallic components leads to a lower natural frequency of the actuator arm, leading to increased noise and vibration issues.

Thus, while current wastegate actuator arms achieve their intended purpose, there is a need for a new and improved wastegate actuator arm that provides reliable translation of linear motion from an actuator to rotational motion of a wastegate valve and reduces the noise, vibration, mass wear and reliability issues related to traditional wastegate actuator arms.

SUMMARY

According to several aspects of the present disclosure, a turbocharger wastegate actuator arm includes a first section, a second section, and a third section between and interconnecting the first and second sections and adapted to allow angular deflection of the first section relative to the second section.

According to another aspect, a longitudinal axis of the first section and a longitudinal axis of the second section define a first angle when the actuator arm is in the first position and the longitudinal axis of the first section and the longitudinal axis of the second section define a second angle when the actuator arm is in the second position, the first angle being greater than the second angle.

According to another aspect, the second section of the actuator arm is adapted to be connected to a wastegate shaft and to rotate unitarily with the wastegate shaft about an axis of the wastegate shaft.

According to another aspect, the second section of the actuator arm includes a keyed opening adapted to engage a corresponding projection of the wastegate shaft.

According to another aspect, the second section of the actuator arm is adapted to be welded to the wastegate shaft.

According to another aspect, the second section of the actuator arm includes a first piece and a second piece, the first piece of the second section of the actuator arm adapted to be connected to the wastegate shaft, the second piece of the second section of the actuator arm being connected to the third section of the actuator arm, and the first and second pieces of the second section of the actuator arm being connected to each other.

According to another aspect, the first piece of the second section of the actuator arm is one of bolted, pinned, and riveted to the second piece of the second section of the actuator arm.

According to another aspect, the first section of the actuator arm is adapted to be one of bolted, pinned, and riveted to an actuator.

According to another aspect, the first section of the actuator arm and the second section of the actuator arm are made from a rigid composite material.

According to another aspect, the third section of the actuator arm is made from a flexible polymeric material.

According to several aspects of the present disclosure, a turbocharger includes a wastegate shaft rotatable between a first position and a second position, an actuator adapted to rotate the wastegate between the first and second positions, and a wastegate actuator arm positioned between and interconnecting the actuator and the wastegate shaft, the wastegate actuator arm including a first section connected to the actuator, a second section connected to the wastegate shaft, and a third section between and interconnecting the first and second sections and adapted to allow angular deflection of the first section relative to the second section.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
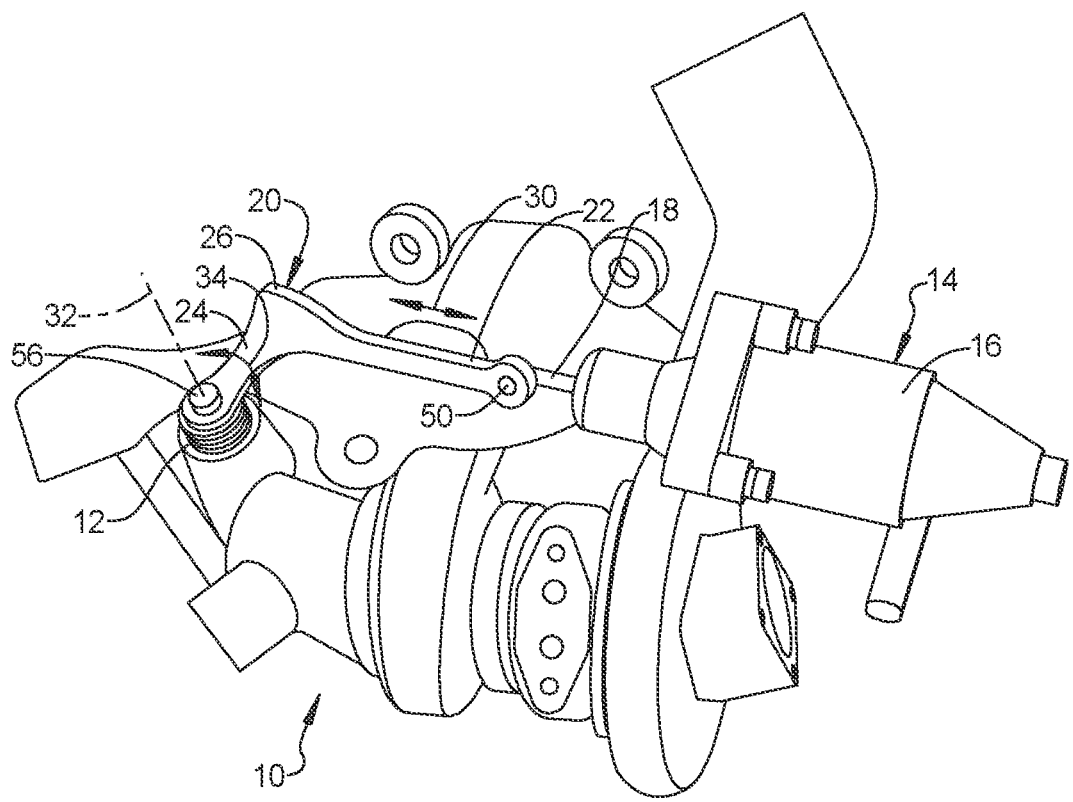
FIG. 1 is a perspective view of a turbocharger having a wastegate actuator arm according to an exemplary embodiment.

Referring to FIG. 1, a turbocharger 10 for use with automotive engines includes a wastegate shaft 12 that is rotatable between a first position and a second position. The wastegate shaft 12 is connected to an internal wastegate valve (not shown), wherein the wastegate shaft 12 and the wastegate valve rotate together. When the wastegate shaft 12 is in the first position, the wastegate valve is closed, and when the wastegate shaft 12 is in the second position, the wastegate valve is open.

An actuator 14 is adapted to rotate the wastegate shaft 12 between the first and second positions. The actuator 14 includes a motor 16 adapted to move an actuator rod 18 linearly back and forth.

A wastegate actuator arm 20 is positioned between and interconnects the actuator rod 18 of the actuator 14 and the wastegate shaft 12. The wastegate actuator arm 20 includes a first section 22 that is connected to the actuator rod 18, a second section 24 that is connected to the wastegate shaft 12, and a third section 26 that is positioned between and interconnects the first and second sections 22, 24. The third section 26 is adapted to allow angular deflection of the first section 22 relative to the second section 24.

In an exemplary embodiment, the first section 22 of the actuator arm 20 and the second section 24 of the actuator arm 20 are made from a rigid composite material, such as, but not limited to, a high temperature carbon fiber material. The rigid composite material is adapted to allow the first section 22 to translate linear motion from the actuator 14 with little or no deflection, and to allow the second section 24 to translate rotational motion to the wastegate shaft 12 with little or no deflection. The third section 26 of the actuator arm 20 is made from a flexible polymeric material, such as, but not limited to, high temperature polyimide resins/composites like DMBZ-15 and PMR-15. The flexible polymeric material is adapted to allow angular deflection of the first section 22 relative to the second section 24.

Polyimides are a class of polymers notable for chemical, wear, radiation, and temperature resistance, characteristics that have led to applications as diverse as aerospace engine housings and electronics packaging. The appeal of polyimides is attributable to their unique combination of high-thermal stability, good chemical and solvent resistance, as well as excellent retention of mechanical properties at high temperature. PMR-15 is a resin that offers easy composite processing, excellent mechanical property retention for long-term use at temperatures up to 288° C. (550° F.), and is relatively inexpensive. DMBZ-15 enables the development of fiber-reinforced polymer matrix composites with use temperatures as high as 343° C. (650° F.), and DMBZ-15 graphite fiber reinforced composites exhibit an operational temperature range up to 335° C. (635° F.).

The first section 22 of the actuator arm 20 is axially moveable back and forth along a longitudinal axis 28 of the first section 22 of the actuator arm 20 along with the actuator rod 18 of the actuator 14, as indicated by arrow 30. The second section 24 of the actuator arm 20 is pivotally moveable, along with the wastegate shaft 12, about an axis 32 of the wastegate shaft 12, as indicated by arrow 34. The first and second sections 22, 24 of the actuator arm 20 are moveable, along with the actuator rod 18 and the wastegate shaft 12, between the first position and the second position.

Figure 2A:
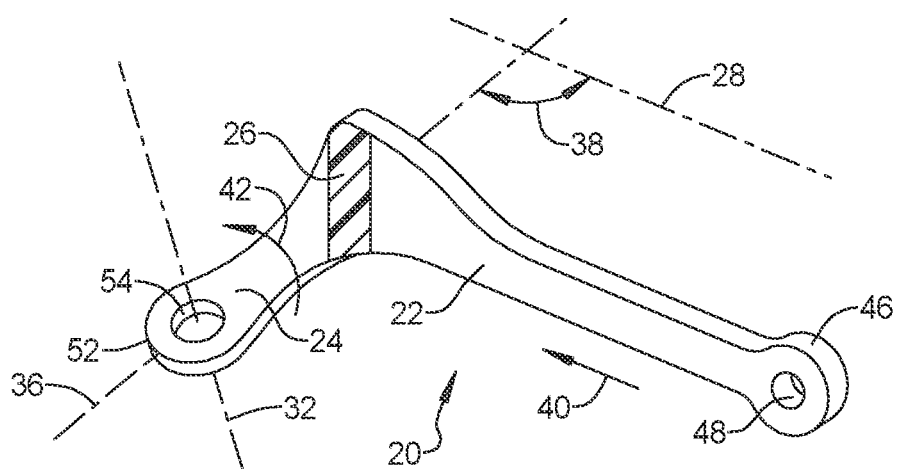
FIG. 2A is a perspective view of a wastegate actuator arm according to an exemplary embodiment, wherein the actuator arm is in a first position.

Referring to FIG. 2A, the actuator arm 20 is shown removed from the turbocharger 10, in the first position. The longitudinal axis 28 of the first section 22 and a longitudinal axis 36 of the second section 24 when the actuator rod 18, the actuator arm 20 and the wastegate shaft 12 are in the first position, define a first angle 38. The actuator 14 moves the first section 22 from the first position toward the second position, as indicated by arrow 40, which in turn, rotates the second section 24 from the first position toward the second position, as indicated by arrow 42.

Figure 2B:
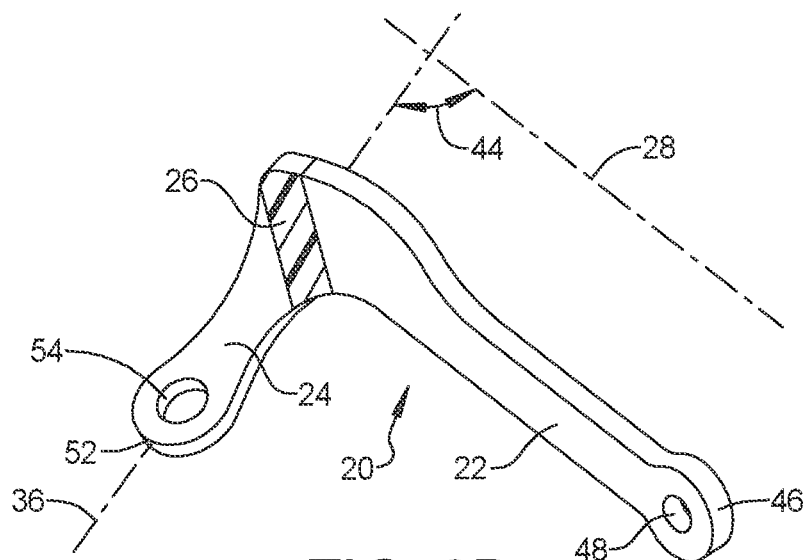
FIG. 2B is a perspective view of the wastegate actuator arm shown in FIG. 2A, wherein the actuator arm is in a second position.

Referring to FIG. 2B, the actuator arm 20 is shown removed from the turbocharger 10, in the second position. The longitudinal axis 28 of the first section 22 and the longitudinal axis 36 of the second section 24 when the actuator rod 18, the actuator arm 20 and the wastegate shaft 12 are in the second position, define a second angle 44. The first angle 38 is larger than the second angle 44, as the rotational position of the second section 24 changes relative to the first section 22.

Figure 3:
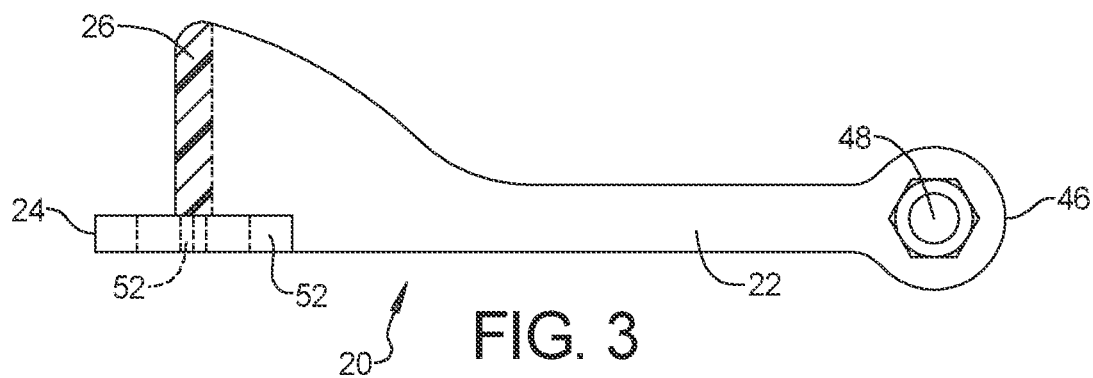
FIG. 3 is a side view of the wastegate actuator arm shown in FIG. 2A.

Referring to FIG. 3, a distal end 46 of the first section 22 includes an aperture 48 adapted to allow attachment of the first section 22 to the actuator rod 18, such as, by way of a non-limiting example, with a threaded fastener 50. It should be understood that other methods of connecting the distal end 46 of the first section 22 to the actuator rod 18 may be used, such as, but not limited to, pinned or riveted connections.

Figure 4A:
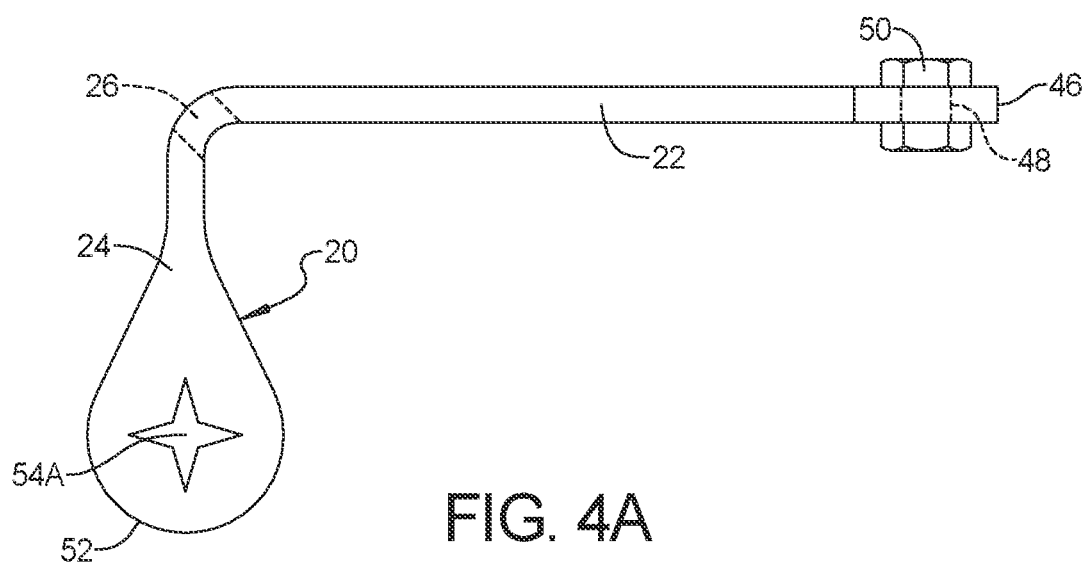
FIG. 4A is a top view of the actuator arm shown in FIG. 2A, wherein a distal end of the second section includes a keyed opening in accordance with an exemplary embodiment.
Figure 4B:
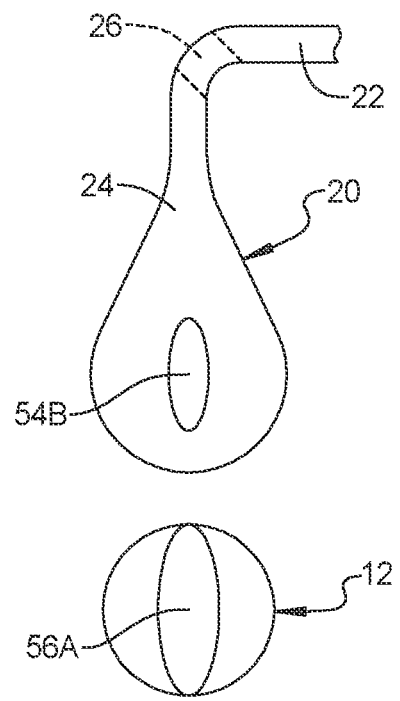
FIG. 4B is a top view of the distal end of the second section of an actuator arm having a keyed opening in accordance with another exemplary embodiment.

A distal end 52 of the second section 24 is adapted to be fixedly connected to the wastegate shaft 12, wherein the second section 24 of the actuator arm 20 and the wastegate shaft 12 rotate unitarily about the axis 32 of the wastegate shaft 12. A keyed engagement between the distal end 52 of the second section 24 and the wastegate shaft 12 provide unitary rotation of the second section 24 and the wastegate shaft 12. The second section 24 includes a keyed opening 54 that is cast in place or machined into the distal end 52 thereof that is adapted to engage a cast or machined projection 56 of the wastegate shaft 12. Referring to FIG. 4A, in an exemplary embodiment, the distal end 52 of the second section 24 includes a star shaped aperture 54A adapted to engage a corresponding star shaped projection of the wastegate shaft 12. Referring to FIG. 4B, in another exemplary embodiment, the distal end 52 of the second section 24 includes a slot 54B adapted to engage a corresponding shaped projection tab 56A of the wastegate shaft 12. In an exemplary embodiment, there is an interference fit between the keyed opening 54 formed within the distal end 52 of the second section 24 and the projection 56 of the wastegate shaft 12, wherein the distal end 52 of the second section 24 is press fit onto the projection 56 of the wastegate shaft 12. In another exemplary embodiment, the distal end 52 of the second section 24 is welded to the wastegate shaft 12.

Figure 5:
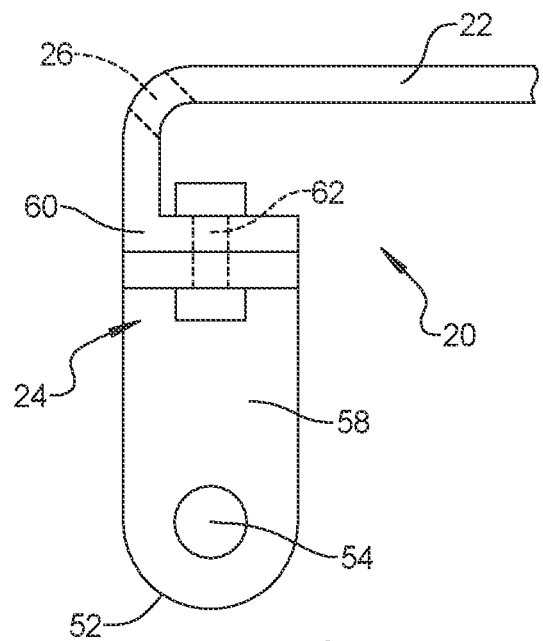
FIG. 5 is a top view of the distal end of the second section of an actuator arm, wherein the second section includes a first piece and a second piece.

Referring to FIG. 5, in another exemplary embodiment, the second section 24 of the actuator arm 20 includes a first piece 58 and a second piece 60. The first piece 58 of the second section 24 of the actuator arm 20 is connected to the wastegate shaft 12. The second piece 60 of the second section 24 of the actuator arm 20 is connected to the third section 26 of the actuator arm 20. The first and second pieces 58, 60 of the second section 24 of the actuator arm 20 are connected to each other. As shown, the first and second pieces 58, 60 of the second section 24 of the actuator arm 20 are connected by a threaded fastener 62. It should be understood that the first and second pieces 58, 60 of the second section 24 could be connected by other methods, such as, but not limited to, a pinned or riveted connection.

Figure 6:
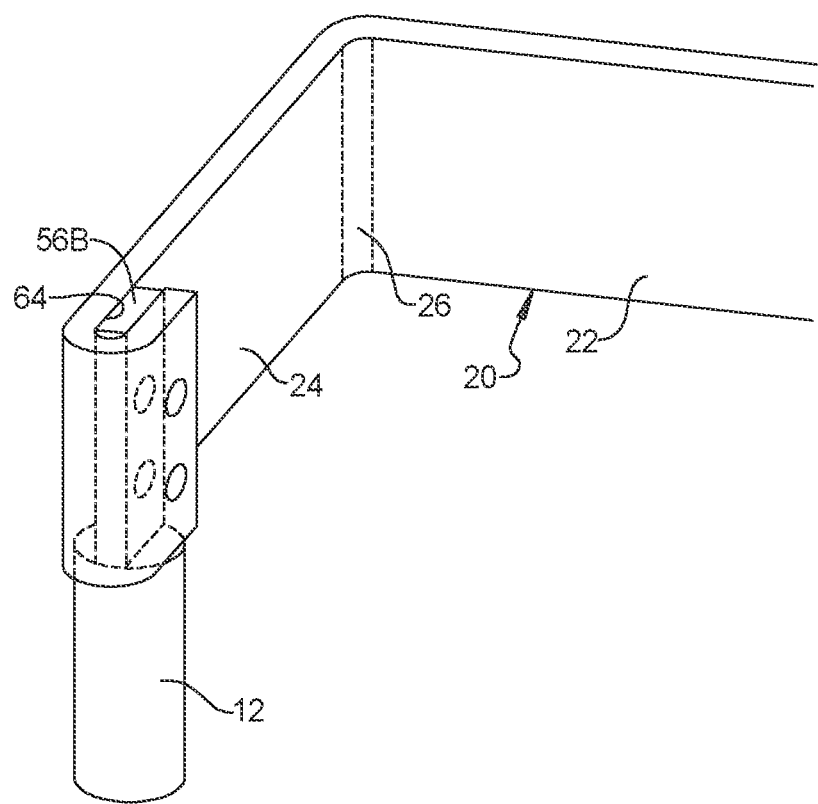
FIG. 6 is a perspective view of the distal end of the second section of an actuator arm according to another exemplary embodiment.

Referring to FIG. 6, in another exemplary embodiment, the distal end 52 of the second section 24 of the actuator arm 20 forms a substantially U-shaped slot 64 adapted to engage a corresponding flat projection 56B of the wastegate shaft 12. The flat projection 56B of the wastegate shaft 12 may be machined into the wastegate shaft 12 or cast in place when the wastegate shaft 12 is formed.

A turbocharger wastegate actuator arm 20 of the present disclosure offers several advantages. These include the elimination of corrosion issues experienced by traditional metallic component actuator arms, reduction of frictional wear between components that have sliding frictional engagement, reduction of mass and improvement of modal/dynamic stress performance due to composite material composition, and reduction or elimination of noise and vibration issues associated with multiple pieced metallic actuator arms.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A turbocharger, comprising:
a wastegate shaft rotatable between a first position and a second position;
an actuator adapted to rotate the wastegate between the first and second positions; and
a wastegate actuator arm positioned between and interconnecting the actuator and the wastegate shaft, the wastegate actuator arm including a first section connected to the actuator, a second section connected to the wastegate shaft, and a third section between and interconnecting the first and second sections and adapted to allow angular deflection of the first section relative to the second section.

2. The turbocharger of claim 1, wherein the first section of the actuator arm is axially moveable and the second section of the actuator arm is pivotally moveable about an axis of the wastegate shaft, the first and second sections moveable between a first position and a second position.

3. The turbocharger of claim 2, wherein a longitudinal axis of the first section and a longitudinal axis of the second section define a first angle when the actuator arm is in the first position and the longitudinal axis of the first section and the longitudinal axis of the second section define a second angle when the actuator arm is in the second position, the first angle being greater than the second angle.

4. The turbocharger of claim 3, wherein the second section of the actuator arm and the wastegate shaft rotate unitarily about the axis of the wastegate shaft.

5. The turbocharger of claim 4, wherein the first section of the actuator arm is one of bolted, pinned, and riveted to the actuator.

6. The turbocharger of claim 4, wherein the first section of the actuator arm and the second section of the actuator arm is made from a rigid composite material, and the third section of the actuator arm is made from a flexible polymeric material.

7. The turbocharger of claim 4, wherein the second section of the actuator arm includes a first piece and a second piece, the first piece of the second section of the actuator arm being connected to the wastegate shaft, the second piece of the second section of the actuator arm being connected to the third section of the actuator arm, and the first and second pieces of the second section of the actuator arm being connected to each other.

8. The turbocharger of claim 7, wherein the first piece of the second section of the actuator arm is one of bolted, pinned, and riveted to the second piece of the second section of the actuator arm.

9. A turbocharger wastegate actuator arm, comprising:
a first section;
a second section; and
a third section between and interconnecting the first and second sections and adapted to allow angular deflection of the first section relative to the second section.

10. The turbocharger wastegate actuator arm of claim 9, wherein a longitudinal axis of the first section and a longitudinal axis of the second section define a first angle when the actuator arm is in the first position and the longitudinal axis of the first section and the longitudinal axis of the second section define a second angle when the actuator arm is in the second position, the first angle being greater than the second angle.

11. The turbocharger wastegate actuator arm of claim 10, wherein the second section of the actuator arm is adapted to be connected to a wastegate shaft and to rotate unitarily with the wastegate shaft about an axis of the wastegate shaft.

12. The turbocharger wastegate actuator arm of claim 11, wherein the second section of the actuator arm includes a keyed opening adapted to engage a corresponding projection of the wastegate shaft.

13. The turbocharger wastegate actuator arm of claim 11, wherein the second section of the actuator arm is adapted to be welded to the wastegate shaft.

14. The turbocharger wastegate actuator arm of claim 11, wherein the first section of the actuator arm is adapted to be one of bolted, pinned, and riveted to an actuator.

15. The turbocharger wastegate actuator arm of claim 11, wherein the second section of the actuator arm includes a first piece and a second piece, the first piece of the second section of the actuator arm adapted to be connected to the wastegate shaft, the second piece of the second section of the actuator arm being connected to the third section of the actuator arm, and the first and second pieces of the second section of the actuator arm being connected to each other.

16. The turbocharger wastegate actuator arm of claim 15, wherein the first piece of the second section of the actuator arm is one of bolted, pinned, and riveted to the second piece of the second section of the actuator arm.

17. The turbocharger wastegate actuator arm of claim 11, wherein the first section of the actuator arm and the second section of the actuator arm are made from a rigid composite material.

18. The turbocharger wastegate actuator arm of claim 17, wherein the third section of the actuator arm is made from a flexible polymeric material.

19. A turbocharger wastegate actuator arm, comprising:

a first section made from a rigid composite material;

a second section made from a rigid composite material; and a third section made from a flexible polymeric material positioned between and interconnecting the first and second sections and adapted to allow angular deflection of the first section relative to the second section, wherein a longitudinal axis of the first section and a longitudinal axis of the second section define a first angle when the actuator arm is in the first position and the longitudinal axis of the first section and the longitudinal axis of the second section define a second angle when the actuator arm is in the second position, the first angle being greater than the second angle.

20. The turbocharger wastegate actuator arm of claim 19, wherein the second section of the actuator arm is adapted to be connected to a wastegate shaft and to rotate unitarily with the wastegate shaft about an axis of the wastegate shaft, and the first section of the actuator arm is adapted to be connected to an actuator.

* * * * *